United States Patent

Cha et al.

Patent Number: 5,536,477
Date of Patent: Jul. 16, 1996

[54] POLLUTION ARRESTOR

[75] Inventors: Suk B. Cha, Laramie, Wyo.; Chang Y. Cha, 3807 Reynolds St., Laramie, Wyo. 82070

[73] Assignee: Chang Yul Cha, Laramie, Wyo.

[21] Appl. No.: 404,682

[22] Filed: Mar. 15, 1995

[51] Int. Cl.[6] ............... B01D 50/00; B01D 53/34; F01N 3/00

[52] U.S. Cl. ............... 422/171; 422/177; 422/182; 422/186.29; 60/274; 60/300; 60/302; 96/15

[58] Field of Search ............... 422/168, 169, 422/170, 171, 177, 182, 186.29, 21, 900; 60/275, 300, 302, 274; 96/15

[56] References Cited

U.S. PATENT DOCUMENTS

| | | | |
|---|---|---|---|
| 4,076,606 | 2/1978 | Suzuki et al. | 204/157.1 |
| 4,345,983 | 8/1982 | Wan | 204/158 |
| 4,364,760 | 12/1982 | Higuchi et al. | 55/523 |
| 4,477,771 | 10/1984 | Nagy et al. | 324/58.5 C |
| 4,545,879 | 10/1985 | Wan et al. | 204/158 R |
| 4,825,651 | 5/1989 | Puschner et al. | 60/275 |
| 4,829,766 | 5/1989 | Henkel | 60/303 |
| 4,934,141 | 6/1990 | Ollivon et al. | 60/275 |
| 5,009,857 | 9/1991 | Haerle | 422/180 |
| 5,074,112 | 12/1991 | Walton et al. | 60/275 |
| 5,087,272 | 2/1992 | Nixdorf | 55/96 |
| 5,180,559 | 1/1993 | Ma | 422/168 |
| 5,423,180 | 6/1995 | Nobue et al. | 60/274 |

OTHER PUBLICATIONS

Kirk–Othmer, Encyclopedia of Chemical Technology, 3; vol 15, Microwave Technology, 494–522; Supp. vol., Plasma Technology, 599–608.

Dziewiecki & Dziewiecki, $NO_x$ reduction with hydrocarbons over some oxide catalysts, Catalysis Today, 17, 121–130, 1993.

Primary Examiner—N. Bhat
Attorney, Agent, or Firm—John O. Mingle

[57] ABSTRACT

A pollution arrestor removes various pollutants, such as soot, $NO_x$, CO and hydrocarbons, from a gas stream. The pollution arrestor is composed in layers starting with a particulate filter to remove soot followed by various catalytic sections enhanced by radiofrequency microwave energy. The leaving gas is substantially reduced in pollution.

2 Claims, 1 Drawing Sheet

1
POLLUTION ARRESTOR

BACKGROUND OF INVENTION

1. Field of Invention.

The present invention relates to an article of manufacture using radiofrequency energy to catalyze the removal of gaseous pollution contaminants, such as soot, $NO_x$, CO and hydrocarbons.

2. Background.

A gaseous stream, often obtained from some combustion or heating process, contains many substances that are potentially classified as pollution contaminants, such as soot, $NO_x$, CO and hydrocarbons.

Soot is a substance usually associated with carbonaceous material formed upon incomplete combustion. It is black, messy and sometimes "feels" oily because of the large amount of hydrocarbons clinging to the base carbon material. A common source of soot is the exhaust from a diesel engine and such soot is visible from many diesel trucks particularly under acceleration. Another common use of diesel engines is for mining where such engines are employed to power underground transportation equipment. In all instances soot is considered an unwanted substance that presents environmental problems since carcinogenic compounds are often found in diesel exhaust adsorbed upon such soot. Additionally some trace quantities of metallic compounds are often found in soot. Most aerosol associated with soot is most likely under one micrometer in size; therefore, it generally is respirable and can cause lung damage.

The U.S. Bureau of Mines estimated that more than ninety percent of the measured aerosol under one micrometer in size in mine atmospheres came from diesel exhaust. Further the average concentration of diesel particulate matter varied from 0.53 to 1.2 $mg/m^3$ in such mines.

Another product of combustion is various nitrogen oxides, usually given the symbol $NO_x$ since their molecular form often is unknown. $NO_x$ is a common constitute of smog in many cities and its control often is mandated by federal law. A further product of combustion is carbon monoxide, CO, which is poisonous and so unwelcome in exhaust gases.

In many instances gases that are exhausted contain various hydrocarbons either from incomplete combustion of fuels or from the non-combustion heating of organic material. An example of the latter case is the exhaust coming from a cooking grill where the heating of meat and other organic material drives of various hydrocarbons, and often such hydrocarbons condense in cooler parts of the exhaust system and represent a fire hazard. In other instances hydrocarbons from incomplete combustion contribute to the smog problem.

The subject invention is a pollution arrestor. In this writing 'pollution arrestor' is defined as 'an article of manufacture through which a polluted gas is passed in order to reduce the concentration of unwanted contaminants.' In the subject invention such reduction or removal is by chemical means whereby said contaminants undergo chemical reactions to convert them into non-polluting forms. Such reactions use catalytic means including radiofrequency (RF) energy catalysis employing specific forms of carbonaceous material that are energized by RF energy. Such equipment is often in the form of a cartridge that is inserted into an appropriate RF field.

2

Quantum radiofrequency physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is conveniently divided into ultrasonic, microwave, and optical regions. The microwave region runs from 300 Mhz (megahertz) to 300 Ghz (gigahertz) and encompasses frequencies used for much communication equipment. For additional information refer to N. Cook, *Microwave Principles and Systems*, Prentice-Hall, 1986.

Often the term microwaves or microwave energy is applied to a broad range of radiofrequency energies particularly with respect to the common frequencies, 915 MHz and 2450 MHz. The former is often employed in industrial heating applications while the latter is the frequency of the common household microwave oven and therefore represents a good frequency to excite water molecules. In this writing the term 'microwaves' is generally employed to represent 'radiofrequency energies selected from the range of about 915 to 5000 MHz,' since in a practical sense this total range is employable for the subject invention.

The absorption of microwaves by the energy bands, particularly the vibrational energy levels, of the atoms or molecules results in the thermal activation of the nonplasma material and the excitation of valence electrons. The nonplasma nature of these interactions is important for a separate and distinct form of heating employs plasma formed by arc conditions of a high temperature, often more than 3000° F., and at much reduced pressures or vacuum conditions. For instance, refer to Kirk-Othmer, *Encyclopedia of Chemical Technology*, 3rd Edition, Supplementary Volume, pages 599–608, Plasma Technology. In microwave technology, as applied in the subject invention, neither condition is present and therefore no plasmas are formed.

These microwaves lower the effective activation energy required for desirable chemical reactions since they can act locally on a microscopic scale by exciting electrons of a specific atom in contrast to normal global heating by raising the bulk temperature. Further this microscopic interaction is favored by polar molecules whose electrons become locally excited leading to high chemical activity; however, nonpolar molecules adjacent to such polar molecules are affected to a much lesser extent. An example is the heating of polar water molecules in a common household microwave oven where the container is of nonpolar material that is microwave-passing and stays relatively cool.

A polar material interacts with microwaves readily and rapidly degrades its effective penetrating power. This aspect is employed in waveguides for microwave transmission since the waveguide transmits the energy along the skin of the guide; therefore, the guide is hollow. Such a hollow waveguide contains a substantially uniform energy field that is utilized particularly for laboratory experiments. However in the subject invention a more commercial version is required that is low cost to make and operate.

As used above microwaves are often referred to as a form of catalysis when applied to chemical reaction rates. For instance, see Kirk-Othmer, *Encyclopedia of Chemical Technology*, 3rd Edition, Volume 15, pages 494–517, Microwave Technology.

Related United States patents using microwaves include:

| U.S. Pat. No. | Inventor | Year |
|---|---|---|
| 4,076,606 | Suzuki et al. | 1978 |
| 4,345,983 | Wan | 1982 |
| 4,545,879 | Wan et al | 1985 |

Referring to the above, Suzuki et al. disclose a process for homogeneously, not hetrogenously, decomposing $NO_x$ using microwave irradiation at the standard microwave frequency in an exhaust gas without any adsorbent present with a preprocessing step of removing sulfur compounds. With no impure carbon material present, no microwave catalysis is occurring and the microwave energy merely excites the nitrogen molecule in a homogeneous gaseous medium.

Wan discloses a method for decomposing solid chlorinated hydrocarbons with a ferromagnetic catalyst using ordinary microwave heating, not microwave catalysis.

Wan et al disclose employing ordinary microwave heating, not microwave catalysis, to desulphurize pulverized petroleum pitch using a ferromagnetic catalyst.

SUMMARY OF INVENTION

The objectives of the present invention include overcoming the above-mentioned deficiencies in the prior art and incorporating some of their advantages into a compound apparatus designed to operate as a pollution arrestor.

DETAILED DESCRIPTION OF INVENTION

Microwaves are a versatile form of energy that is applicable to enhance chemical reactions since the energy is locally applied by its vibrational absorption by polar molecules and does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Radiofrequency catalysis is often performed with a bed of char. Char is a form of pyrolytic carbon which contains many polar impurities. Char is formed by driving gases from coal in a non oxidizing atmosphere. Soot is formed in an oxidizing gas due to incomplete combustion. Although char and soot are both carbonaceous and both contain polar constituents, because they are formed by such different chemical process, their equivalency is not automatically presumed but is proved by experiment.

Figure 1:
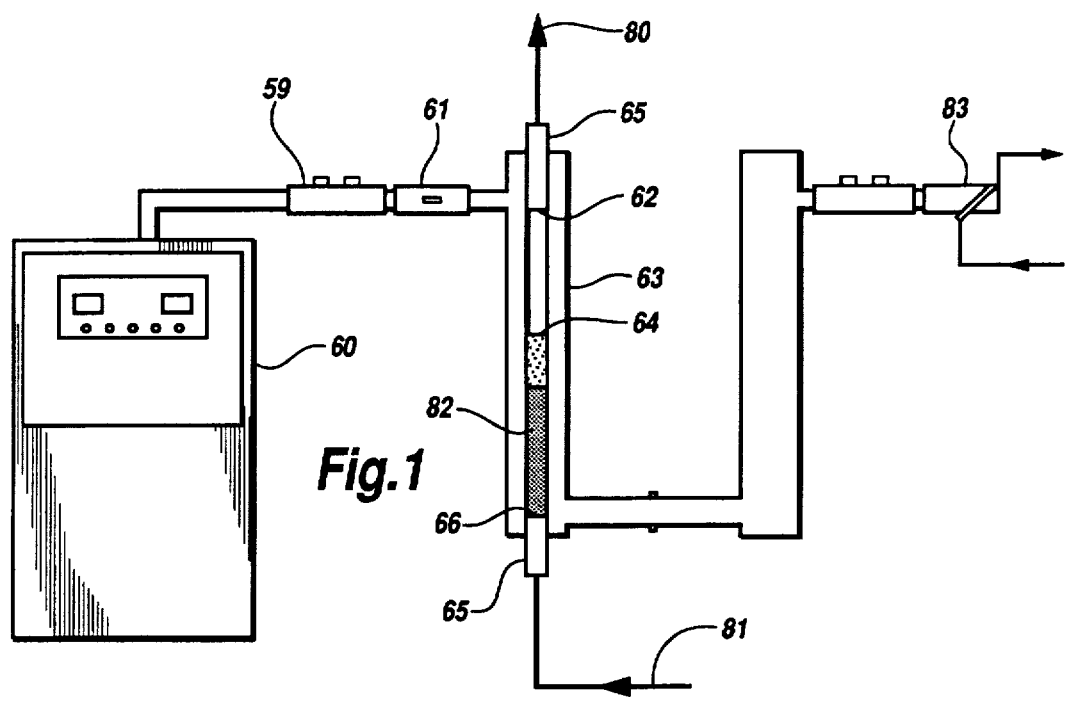
FIG. 1 shows a typical laboratory RF reactor system to perform preliminary tests on soot.

A laboratory microwave reactor system to study experimental conditions for soot collection for microwave catalysis is shown in FIG. 1. A standard commercial microwave energy generator 60 was utilized that was coupled 59 with microwave transmitting waveguide 61 to the microwave cavity 63. The upper ceramic filter 62 acted as a backup to insure that the middle ceramic filter 64, positioned near the quartz tube 65 center, retained all the soot 82. A lower ceramic filter contained the soot 82 when fluidizing gas 81 was turned off. The inlet gas 81, which consisted of air, and nitrogen mixtures, fluidized the soot 82. The overhead gas 80 was metered before release. Alternatively said gas was also analyzed, such as with a gas chromatograph. Because this was a laboratory setup, water cooling 83 was used to protect the microwave equipment.

In use the microwave energy power was adjusted to produce good measurable results for the concentrations selected. In most experiments this power was 500 watts.

The microwave energy field interacted substantially with polar constituents of the soot. Said polar constituents were microwave-absorbing; in contrast the quartz tube, ceramic filter and other materials employed were microwave-passing and interacted very little with said field. If appropriate energy was absorbed by such reactant polar molecules, microwave catalysis occurred causing the formation of reaction products, such as carbon dioxide, as the soot was burned.

The following reactions can occur:

$$C+O_2 \text{ - - - (RF) - - - } >CO_2 \tag{1}$$

$$C+2 NO \text{ - - - (RF) - - - } >CO_2+N_2 \tag{2}$$

$$O_2+2CO \text{ - - - (RF) - - - } >2CO_2 \tag{3}$$

where - - - (RF) - - - > implies that RF microwave energy catalyzes the reaction to proceed in the direction indicated at a lower temperature than normally it would proceed. A convenient bulk temperature is 300° F. It is often convenient to utilize periodic microwave energy. Periodic microwave energy is often utilized since reaction (1) is highly exothermic and time for. cooling is needed. In reaction (2) NO rather than $NO_x$ is employed to simply the stoichiometric relations.

Other catalysts are employable to carry out the desired reactions. For instance, $$2NO \text{ - - - (catalyst-1) - - - } >N_2+O_2 \tag{4}$$

$$2CO+O_2 \text{ - - - (catalyst-2) - - - } >2CO_2 \tag{5}$$

Catalyst-1 is potentially copper-gadolinium which performs well, particularly in the presence of hexane, to reduce $NO_x$ to very low levels. For a description of the production and efficiency of this catalyst see Dziewiecka, B. and Dziewiecka, Z., "$NO_x$ Reduction with Hydrocarbons Over Some Oxide Catalysts," *Catalysis Today*, 17, 121–129, 1993. Catalyst-2 is likely platinum or palladium and further serves to catalyze the oxidation of hydrocarbons at relatively low bulk temperatures, and the exit gas then is substantially free of CO. To further enhance reactions (4) and (5) microwave heating can increase the bulk reaction temperature.

A pollution arrestor for a gas stream flowing through a microwave cavity comprising a plurality of sections which said gas stream passes through in series with a first section consisting of a particulate collecting high temperature filter, and multiple sections following said first section composed of a substrate and a catalyst to remove pollutants. Further said particulate collecting high temperature filter has the capacity to contain substantially all soot present in said gas stream and is selected from group consisting of ceramic filters, ceramic foam filters, or silicon carbide; said catalyst is selected from the group consisting of oxides of copper-gadolinium along perhaps with hexane, or equivalent, injection for $NO_x$ removal, and platinum or palladium for carbon monoxide and hydrocarbon removal; and said substrate is microwave absorbing material such as silicon carbide. In addition said plurality of sections are selected from the group comprising the physical arrangement of concentric hollow cylinders, superposed planes, and aligned hollow cylinders. The microwave cavity is a radiofrequency energy field selected from the frequency range of 915 to 5000 megahertz.

An additional embodiment is a pollution arrestor for a gas stream flowing through a periodically operating microwave cavity comprising a high temperature filter through which said gas stream passes. Further said high temperature filter is a substrate composed of microwave passing material and has the capacity to contain substantially all soot present in said gas stream. The particulate collecting high temperature filter further comprises being selected from group consisting of ceramic filters, ceramic foam filters, or silicon carbide. The gas stream alternately contains oxygen such as originally from air. In addition said periodically operating microwave cavity operates with sufficient on-time by the radiofrequency field of said microwave cavity to substantially remove any soot collected on said high temperature filter during the off-time and further is a radiofrequency energy field selected from the frequency range of 915 to 5000 megahertz.

An additional embodiment is a pollution arrestor for a gas stream flowing through a microwave cavity supporting a radiofrequency energy field selected from the frequency range of 915 to 5000 megahertz, comprising multiple sections composed of concentric hollow cylinders which said gas stream passes through in series from outside to the inner hollow delineated by a honeycomb support, a first section consisting of a particulate collecting high temperature filter, a second section consisting of oxides of copper-gadolinium catalyst upon a silicon carbide substrate, and a third section consisting of platinum or palladium catalyst upon a silicon carbide substrate. The particulate collecting high temperature filter further comprises being selected from group consisting of ceramic filters, ceramic foam filters, or silicon carbide.

Tests were conducted to investigate the microwaving properties of soot by putting about 3 inches of soot, usually approximately 2 grams, obtained from diesel exhaust, in a quartz tube having a diameter of ¾ inch with a length of 48 inches and positioned within a microwave energy cavity. Three ceramic layers of fibers, in essence forming ceramic filters, were used to contain the soot, one at the tube top, one at the tube middle, and one at the tube bottom. The upper ceramic filter was a safety trap. The middle ceramic filter served as primary containment for the fluidized bed while the lower ceramic filter (66) held the fluidizing particles without gas flow. Gas entering the tube bottom at sufficient velocity to normally fluidize said soot which was then constrained by the middle ceramic filter. The RF energy equipment, as shown in FIG. 1, was utilized at a power of 500 watts.

Several runs were made utilizing different gas mixtures. A nitrogen gas run served as a blank test and indicated the soot contained some oxide compounds which underwent microwave catalysis reacting with the carbon.

Another series of runs employed mixtures of air and nitrogen to simulate a diesel exhaust stream where part of the original oxygen present from air had been used up by the diesel combustion process.

Table 1 shows data from these runs concerning the removal of the soot. The percentage of the soot consumed after 30 minutes varied from 16% for the all nitrogen run to 88% for the all air run. Therefore given enough run time with

TABLE 1

500 Watt Microwave Catalysis of Soot for 30 Minutes

| Run | $N_2$ (SCFH) | Air (SCFH) | Soot In(gm) | Soot Out(gm) | Consumed (percent) |
|---|---|---|---|---|---|
| 1 | 2.0 | 0.0 | 2.24 | 1.89 | 16 |
| 2 | 1.5 | 0.5 | 2.14 | 1.54 | 28 |
| 3 | 1.0 | 1.0 | 2.29 | 1.37 | 40 |
| 4 | 0.5 | 1.5 | 2.09 | 0.60 | 71 |
| 5 | 0.0 | 2.0 | 2.16 | 0.27 | 88 |

TABLE 2

500 Watt Microwave Catalysis of Approximately 2 gm of Soot with 1000 ppm NO for 30 Minutes, Residual NO Concentration (ppm).

| Time (min) | $N_2$ 100% Air 0% | $N_2$ 75% Air 25% | $N_2$ 50% Air 50% | $N_2$ 25% Air 75% | $N_2$ 0% Air 100% |
|---|---|---|---|---|---|
| 5 | 42 | 222 | 242 | 142 | 150 |
| 10 | 12 | 16 | 60 | 60 | 61 |
| 15 | 9 | 14 | 33 | 40 | 34 |
| 20 | 9 | 14 | 24 | 31 | 88* |
| 25 | 6 | 11 | 18 | 23 | 242 |
| 30 | 6 | 10 | 14 | 30** | 1042 |

*Soot burned out at 16 min.
**Soot burned out at 27 min.

sufficient oxygen present, the soot was completely burnable.

A further series of tests simulated diesel exhaust by adding 1000 ppm NO to the mixture of air and nitrogen. Table 2 shows data from this series where the NO concentration in the outlet gas is recorded. The test with all air showed the rapid reaction of the soot as the NO concentration bottomed out at 34 ppm after about 16 minutes at which time the soot was all consumed. For the 25% $N_2$ and 75% air test the soot was essentially consumed at about 27 minutes with a minimum NO concentration of 22 ppm. The all nitrogen test vividly showed the microwave catalysis at work for the NO concentration kept falling for the full 30 minutes. In all instances a significant reduction in NO occurred.

Figure 2:
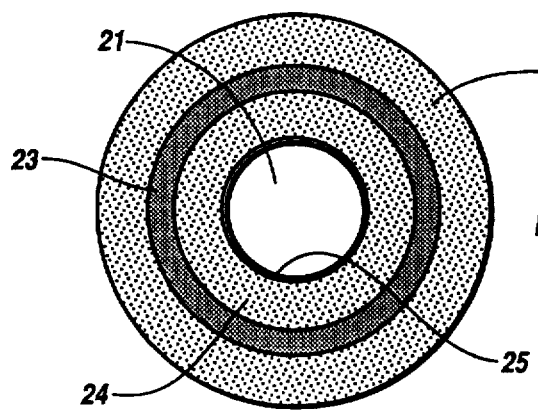
FIG. 2 shows a cross section of the multiple catalyst pollution arrestor cartridge.
Figure 3:
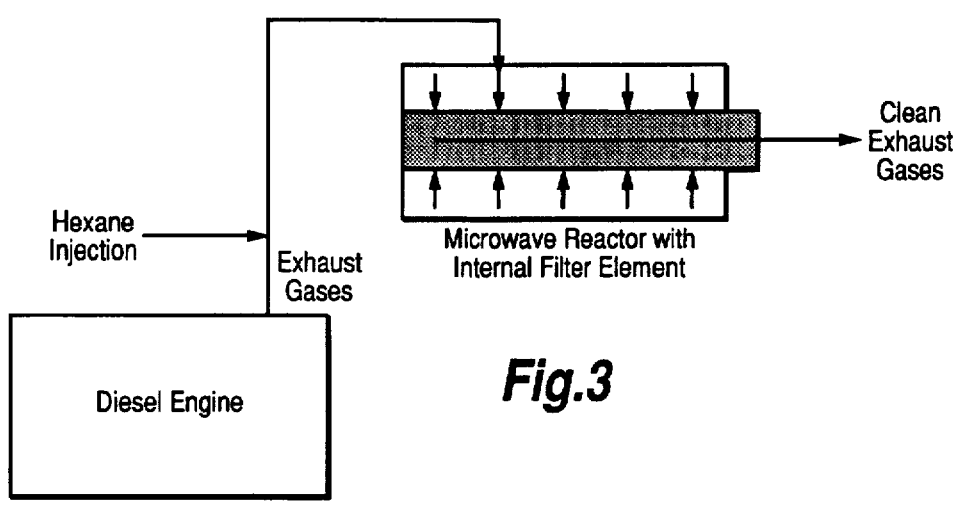
FIG. 3 shows a schematic of a pollution arrestor setup for diesel exhaust.

In the subject invention the pollution arrestor as designed is shown in FIG. 2. The physical form of said pollution arrestor is not critical, but in FIG. 2 is shown as concentric cylinders with the polluted gas entering from the outside and clean gas exiting from the hollow inside 21. The first outer cylinder section 22 is to capture particulate matter such as soot and consists of a high temperature filter material, such as Nextel 312 or 440 or equivalent. This filters out the soot and allows its chemical reactions to occur in the microwave energy field. However such soot is potentially a good pyrolytic carbon and will adsorb some gases, such as $NO_x$ and CO, during its flow along in the gas stream and when collected on the high temperature filter; therefore, microwave catalysis will occur as is indicated in reactions (1)–(3) partially reducing these contaminant concentrations in this outer section 22. The second section 23 from the outside contains the oxides of copper-gadolinium catalyst which optionally in the presence of hexane will catalyze the further reduction of $NO_x$. Here the substrate is a substance that will absorb microwaves, such as pyrolytic carbon; however, because of the bulk temperatures associated with the gas stream, high temperature material is convenient and silicon carbide is utilized in the pollution arrestor cartridge. The hexane or other equivalent such as diesel fuel if employed is injected into the gas stream ahead of the pollution arrestor cartridge, as shown in FIG. 3, to a convenient concentration such as 4000 ppm. Any excess hexane or equivalent is removed as an unwanted hydrocarbon by the inside section 24. This inside or third section 24 contains platinum catalyst dispersed in silicon carbide to react in the presence of the microwave field any CO and hydrocarbons to carbon dioxide and water. The hollow inner core where the clean gas 21 leaves is supported by a honeycomb structure 25 that will contain the further outer sections and function at the required temperature. It is ceramic or metal.

The length and radial size of the pollution arrestor depend upon a number of factors, such as the volume of the flowing gas stream and the pressure drop that is acceptable, the surface area needed for chemical reactions to remove the appropriate portion of the contaminants, and the life of the pollution arrestor before replacement. The sizing for a diesel engine powering a 250 kW electrical generator, as shown in FIG. 2, is a six inch outer diameter with a three inch inner, hollow core. The thickness of the outer, first section is ¾ inch, the thickness of the middle, second section is ½ inch, and the thickness of the inner, third section is ¼ inch. The length of the pollution arrestor is two feet.

FIG. 3 shows the placement of the pollution arrestor cartridge in the exhaust stream of a diesel engine. In a system employing only a high temperature filter to capture soot the identified internal filter element is just this high temperature filter. In a system employing multiple catalytic sections, the internal filter element represents a compound filter system whose cross section is shown in FIG. 2. In FIG. 3 a microwave reactor is shown which occurs when the pollution arrestor is inserted into the microwave cavity, but the conventional accessory equipment, such as is shown in FIG. 1, needed to produce the RF energy field are not detailed.

The use of a high temperature filter implies that the material is conventionally ceramic in nature; however, silicon carbide is an alternate material and is particularly useful in microwave applications since it is an excellent microwave absorber. A tradeoff in filter design is made between the requirements of sufficient surface area to collect the required particulate matter, pore size small enough to capture the said particulate matter, and low pressure drop for the flowing gas. The high temperature filter comprises a number of common ceramic materials, such as alumina, mullite, anorthite, or cordierite, and in addition silicon carbide. Further such high temperature filters also can constitute ceramic foams comprising alumina or zirconia, and in addition silicon nitride or silicon carbide. These ceramic foams are made with porosities from 40–85 percent with a wide range of pore sizes from 0.02 to 1.5 mm and are particularly useful when a low pressure drop is required for the flowing gas.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

We claim:

1. A pollution arrestor for a gas stream containing multiple pollutants comprising:

an encompassing microwave cavity;

a plurality of sections being selected from the group consisting of the physical arrangement of concentric hollow cylinders, superposed planes, and aligned hollow cylinders, which said gas stream passes through in series;

a first section consisting of a particulate collecting high temperature filter being selected from group consisting of ceramic filters, ceramic foam filters, and silicon carbide; and multiple sections following said first section composed of a substrate or impregnated substrate impregnated with a material selected from the group consisting of oxides of copper-gadolinium, platinum, and palladium.

2. A pollution arrestor for a gas stream containing soot comprising:

a microwave cavity supporting a radiofrequency energy field selected from the frequency range of 915 to 5000 megahertz, two sections being selected from the group consisting of the physical arrangement of concentric hollow cylinders, superposed planes, and aligned hollow cylinders, and whose substrate contains silicon carbide which said gas stream passes through in series;

a first section consisting of said soot collecting high temperature substrate and further containing oxides of copper-gadolinium catalyst; and a second section consisting of platinum or palladium catalyst upon said substrate.

* * * * *